(12) United States Patent
Wouhaybi et al.

(10) Patent No.: US 9,600,455 B2
(45) Date of Patent: Mar. 21, 2017

(54) HYBRID MOBILE INTERACTIONS FOR NATIVE APPS AND WEB APPS

(75) Inventors: Rita H Wouhaybi, Portland, OR (US); David Shaw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/992,464

(22) PCT Filed: Dec. 28, 2011

(86) PCT No.: PCT/US2011/067642
§ 371 (c)(1),
(2), (4) Date: Jun. 7, 2013

(87) PCT Pub. No.: WO2013/100990
PCT Pub. Date: Jul. 4, 2013

(65) Prior Publication Data
US 2014/0282119 A1    Sep. 18, 2014

(51) Int. Cl.
*G06F 3/0488* (2013.01)
*G06F 17/22* (2006.01)
(Continued)

(52) U.S. Cl.
CPC ........ *G06F 17/2247* (2013.01); *G06F 3/0486* (2013.01); *G06F 3/0488* (2013.01);
(Continued)

(58) Field of Classification Search
CPC ............... G06F 3/04883; G06F 3/0481; G06F 3/04886; G06F 2203/04803
(Continued)

(56) References Cited

U.S. PATENT DOCUMENTS 8,375,295 B2 *   2/2013   Zalewski et al. ............. 715/234
8,473,870 B2 *   6/2013   Hinckley et al. ............. 715/863
(Continued)

FOREIGN PATENT DOCUMENTS

CN     101686280 A     3/2010
CN     104115106 A     10/2014
(Continued)

OTHER PUBLICATIONS

"International Application Serial No. PCT/US2011/067642, Search Report mailed Sep. 27, 2012", 3 pgs.
(Continued)

*Primary Examiner* — Andrew Tank
(74) *Attorney, Agent, or Firm* — Schwegman Lundberg & Woessner, P.A.

(57) ABSTRACT

There is disclosed a system, including apparatus, methods and computer programs, for running native software applications (apps) and HTML5 web-based apps on a computing device, particularly a mobile computing device, in a multi-tasking mode of operation. In one embodiment, touch screen displays having one or more browsers are adapted to run one or more HTML5 apps, and receive input from hand gestures. One or more software modules execute on the operating system and are responsive to a dragging gesture applied to an HTML5 app displayed in a full screen mode, to subdivide the screen display and display the HTML5 app in one of the subdivided areas and display icons used to launch a second HTML5 app in a different one of the subdivided areas. The second HTML5 app is run concurrently with the first HTML5 app in order to provide multi-tasking between the first and second apps.

21 Claims, 10 Drawing Sheets

(51) Int. Cl.
  *G06F 3/0481* (2013.01)
  *G06F 3/0486* (2013.01)
(52) U.S. Cl.
  CPC ...... *G06F 3/04817* (2013.01); *G06F 3/04883* (2013.01); *G06F 3/04886* (2013.01); *G06F 2203/04803* (2013.01); *G09G 2370/10* (2013.01)
(58) Field of Classification Search
  USPC .......................... 715/240, 760, 792, 835, 863
  See application file for complete search history.

(56) References Cited

U.S. PATENT DOCUMENTS

| | | | |
|---|---|---|---|
| 8,677,284 B2 * | 3/2014 | Aguilar | 715/863 |
| 2007/0033569 A1 * | 2/2007 | Davidson et al. | 717/103 |
| 2010/0081475 A1 * | 4/2010 | Chiang et al. | 455/564 |
| 2010/0248788 A1 | 9/2010 | Yook et al. | |
| 2010/0257447 A1 | 10/2010 | Kim et al. | |
| 2011/0107272 A1 | 5/2011 | Aguilar | |
| 2011/0202872 A1 | 8/2011 | Park | |
| 2011/0208852 A1 * | 8/2011 | Looney et al. | 709/223 |
| 2011/0252357 A1 | 10/2011 | Chaudhri | |
| 2011/0252380 A1 | 10/2011 | Chaudhri | |
| 2011/0252446 A1 * | 10/2011 | Jeong et al. | 725/40 |
| 2012/0066628 A1 * | 3/2012 | Ens et al. | 715/769 |
| 2012/0131519 A1 * | 5/2012 | Jitkoff | 715/863 |
| 2013/0145290 A1 * | 6/2013 | Weber et al. | 715/760 |
| 2013/0159892 A1 * | 6/2013 | Suraj et al. | 715/762 |

FOREIGN PATENT DOCUMENTS

| | | |
|---|---|---|
| EP | 2798452 A1 | 11/2014 |
| KR | 1020110026811 A | 3/2011 |
| TW | 201129907 A | 9/2011 |
| TW | 201333823 A | 8/2013 |
| WO | WO 2009018277 A1 * | 2/2009 ............ H04L 29/08 |
| WO | WO-2010110613 A1 | 9/2010 |
| WO | WO-2011099803 A2 | 8/2011 |
| WO | WO-2013100990 A1 | 7/2013 |

OTHER PUBLICATIONS

"International Application Serial No. PCT/US2011/067642, Written Opinion mailed Sep. 27", pgs.

"Chinese Application Serial No. 201180075928.0 , Voluntary Amendment filed Jun. 25, 2014", W/ English Claims, 71 pgs.

"International Application Serial No. PCT/US2011/067642, International Preliminary Report on Patentability mailed Jul. 10,2014", 9 pgs.

"Taiwanese Application Serial No. 101149335, Office Action mailed Jan. 29, 2015", W/ English Search Report, 10 pgs.

"European Application Serial No. 11878489.1, Extended European Search Report mailed Aug. 6, 2015", 8 pgs.

"Taiwanese Application Serial No. 101149335, Final Office Action mailed May 27, 2015", 22 pgs.

"Chinese Application Serial No. 201180075928.0, Office Action mailed Jun. 3, 2016", W/ English Translation, 8 pgs.

"European Application Serial No. 11878489.1, Response filed Mar. 4, 2016 to Extended European Search Report mailed Aug. 6, 2015", 13 pgs.

"Taiwanese Application Serial No. 101149335, Response filed Apr. 24, 2015 to Office Action mailed Jan. 29, 2015", W/ English Claims, 19 pgs.

"Taiwanese Application Serial No. 101149335, Response filed Jul. 27, 2016 to Final Office Action mailed May 27, 2015", W/ English Claims, 87 pgs.

* cited by examiner

HYBRID MOBILE INTERACTIONS FOR NATIVE APPS AND WEB APPS

PRIORITY APPLICATION

This application is a U.S. National Stage Application under 35 U.S.C. 371 from International Application No. PCT/US2011/067642, filed Dec. 28, 2011, which is hereby incorporated by reference in its entirety.

TECHNICAL FIELD

The present subject matter relates generally to the field of computers, and more particularly to browser-based applications and user interface displays.

BACKGROUND

HTML5 is a language for structuring and presenting content for the World Wide Web. It is the fifth revision of the HTML standard and as of November 2011 is still under development. Its core aims have been to improve the language with support for the latest multimedia while keeping it easily readable by humans and consistently understood by computers and devices (web browsers, parsers, etc.). HTML5 is intended to subsume not only HTML 4, but XHTML1 and DOM2 HTML (particularly JavaScript/EMCAScript) specifications as well. Many features of HTML5 are provided to enable its use on low-powered devices such as smart phones and tablets. HTML5 supports a variety of techniques to enable dynamic content presentations, including multimedia display elements (such as video, audio, and graphical animation), application caching, background threading, and integrated scripting support.

HTML5 is a disruptive technology and a set of standards. One of its many advantages is allowing apps to run inside a browser, and breaking the model of apps having to be native code and distributed through an app store, or manually installed to a device by a user. This is exceptionally attractive to developers who want to develop apps and sell them without having to share their revenues with app distributors or platform manufacturers. In addition, with HTML5, web apps running inside the browser provide an opportunity to support multitasking and to break from the fragmented world of apps under different operating systems and platforms. This provides an incentive for developers to move to HTML5 and away from native apps, since multitasking has been a leading request of users of mobile platforms. In addition, developers only have to develop one app in HTML5, and it will run on all platforms that support HTML5.

DETAILED DESCRIPTION

Figure 1A:
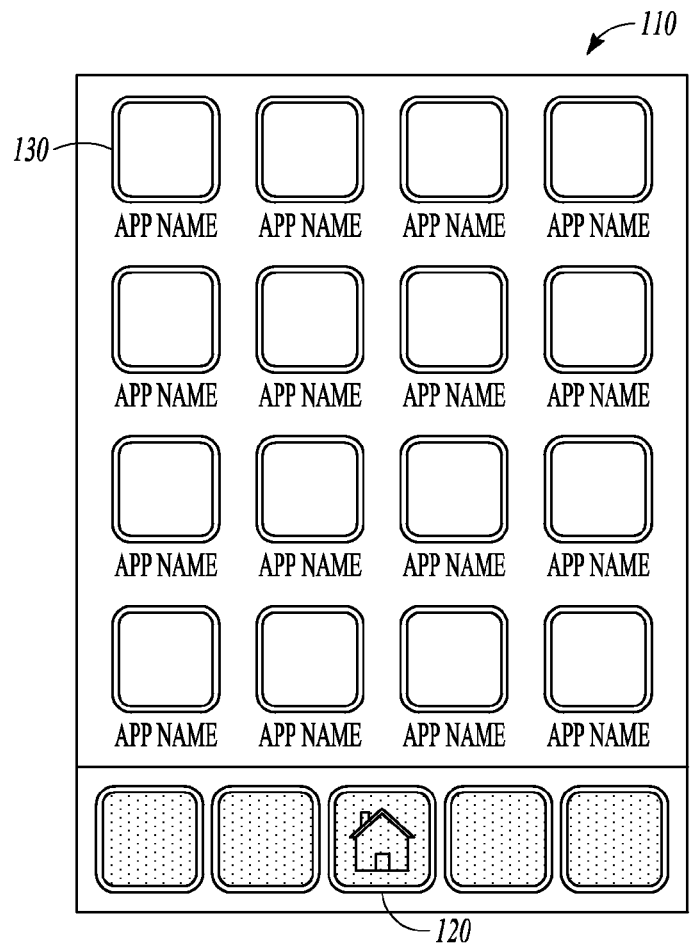
FIGS. 1A and 1B illustrate an example interface and system for launching and executing mobile apps used in connection with an example embodiment.
Figure 1B:
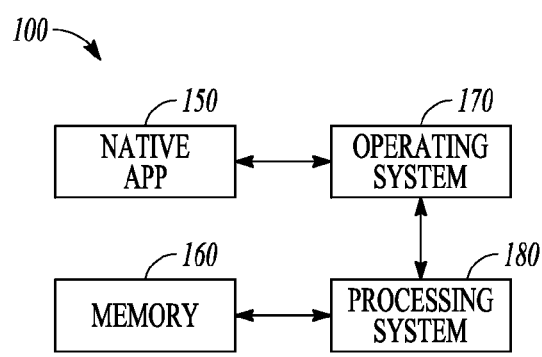

Popular and widely used home screens on mobile devices, such as mobile phones or tablet computers, contain graphical icons that provide links to native apps downloaded and installed on the devices. Users may launch the native apps by selection of the links, for example using a pointing device or touch screen. One example of such an interface and mobile device, illustrated in FIGS. 1A and 1B, is intuitive and easy to operate, and has become the de-facto standard for mobile interactions. In the interface of FIG. 1A, provided by the mobile device 100 of FIG. 1B, native apps are represented by icons (e.g., icon 130), typically rectangular in shape, displayed on the home (or other) screen 120 of the user interface 110 of mobile device 100. When a user selects a native app 150, for example by pressing on the icon 130 associated therewith, the native app 150 launches, is loaded in whole or in part in the memory 160, and begins execution in a full screen mode, typically occupying the entire screen of the mobile device 100. Native apps may be formed of software modules including one or more computer programs.

Further referring to FIG. 1B, the term "native app," as used herein, refers to an app that is loaded, in whole or in part, in memory 160, and executes, at least in part, using instructions and capabilities of an operating system 170. The native app 150 may be specifically designed to run within the device's operating system 170 and machine firmware environment, and may need to be adapted for operation on different hardware or operating system types. Operating system 170 includes a plurality of software modules and is resident on and executing on a processing system 180. Processing system 180, in one example embodiment, includes a processing device capable of executing computer software, such as a central processing unit (CPU), of the mobile device 100.

Figure 2:
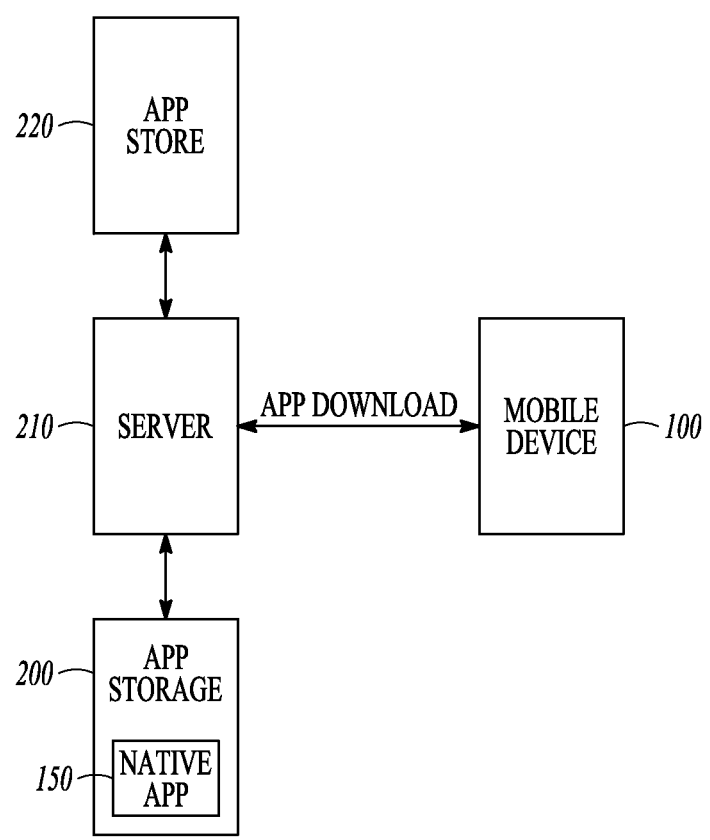
FIG. 2 illustrates an example system for downloading native apps to a mobile device.

Native app 150, in one model of distribution illustrated in FIG. 2, is downloaded to the mobile device 100 responsive to interaction with an interface such as app store 220, operating under the control of a device-accessible server 210. An app storage facility such as app storage 200 provides an installable copy of native app 150, and may be accessed by the user responsive to interactions with the app store 220 and the server 210. For example, the app store 220 may display a catalog of available apps for user selection, and may collect a fee from a user to license and download a copy of the native app 150.

As described herein, there is provided a system, including methods, apparatus, software, and user interfaces, for user interaction with apps. The system supports backward compatibility with the above-described native app interface scheme, while enabling users to take advantage of desirable new capabilities of web apps (for example, HTML5-standard compliant web apps, further referred to herein as "HTML5 apps"). A web app is typically coded in a browserrendered language such as HTML combined with JavaScript, and is designed for a lightweight execution in a browser graphical user interface environment.

Figure 3A:
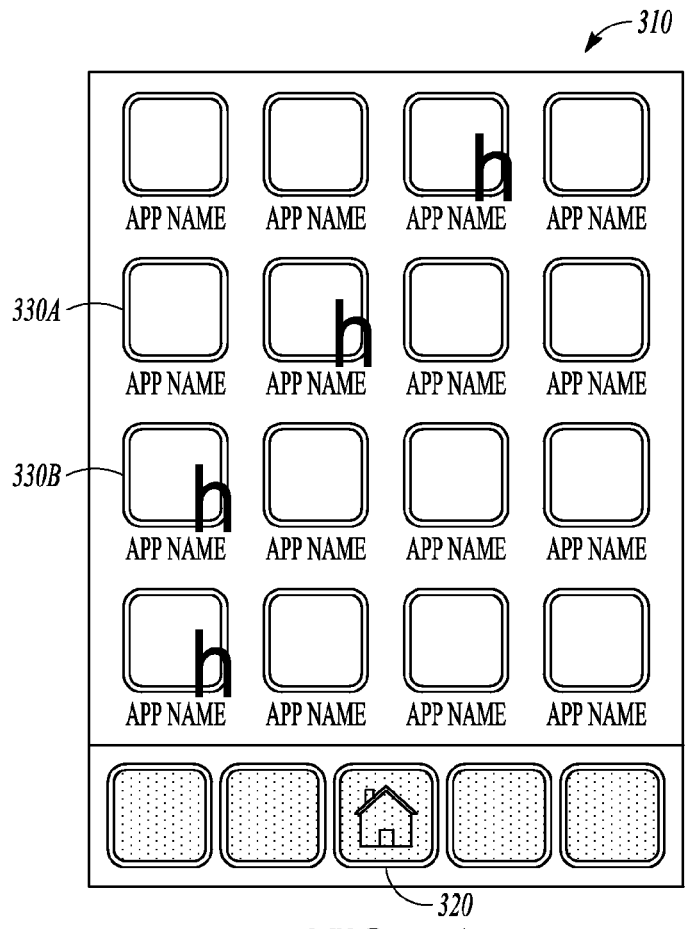
FIGS. 3A and 3B illustrate an example interface and system for running native and HTML5 apps on a mobile device according to an example embodiment.

In one embodiment, user interactions with web apps are provided by a similar user interface as used for native apps. As illustrated in FIG. 3A, non-HTML apps are represented by icon 330a and HTML5 apps are represented by icon 330b, and icons 330a and 330b are comingled and displayed on the home (or other) screen 320 of the user interface 310 of mobile device 300. In FIG. 3A, HTML5 app icons 330b are specially noted with the letter "h"; however, there is no requirement for the HTML5 apps to be so labeled or noted—it is done here only for illustrative purposes. Thus, icons for HTML5 apps may be indistinguishable from icons for native apps.

As described further herein, the following techniques and system configurations provide for interactions with mobile apps, including native app 350a and HTML5 app 350b, accommodating for backward compatibility. Thus, a user may still use a familiar interface to interact with the native app 350a, such as the familiar interface of FIG. 1A, while enabling the user to see, use, interact with, and take advantage of HTML5 app 350b. The following described techniques are also extendable to allow for multi-tasking among web apps, provided by the use of HTML5 apps because of concurrent execution and display of multiple web pages and apps provided within or in connection with the same instance of a browser runtime.

Figure 3B:
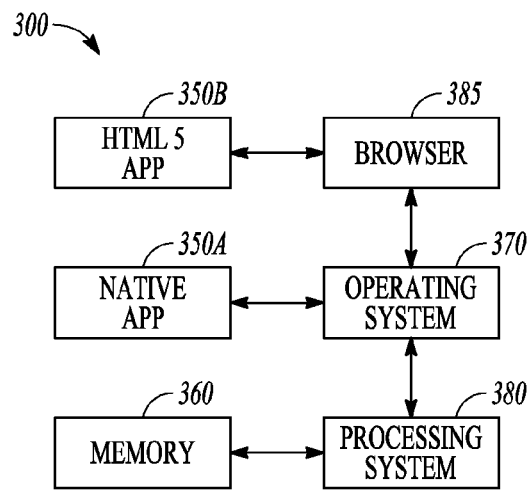

As illustrated in FIG. 3B, native app 350a is loaded in whole or in part in a memory 360, and executes, at least in part, using instructions and capabilities of an operating system 370 resident on and executing on a processing system 380, including a central processing unit (CPU), of the mobile device 300. HTML5 app 350b operates within an HTML5 compliant browser 385 that in turn runs within operating system 370, as opposed to a native app 350a executing directly on operating system 370.

According to one example embodiment, user interface control software is formed from one or more software modules and is operable on operating system 370, is part of the browser 385, and/or is integral with the operating system, in order to perform the functionality described above and the other example alternate embodiments described thereafter. User interface control software accepts user control input from the user interface in any form, such as touch, pointing device, voice, gaze, or any other means, in order to perform the user input described above, and includes computer program code operable on the operating system 370 to control the display in order to effectuate the user interface display features and information exchange also described above and the ensuing description of alternate embodiments.

Figure 4:
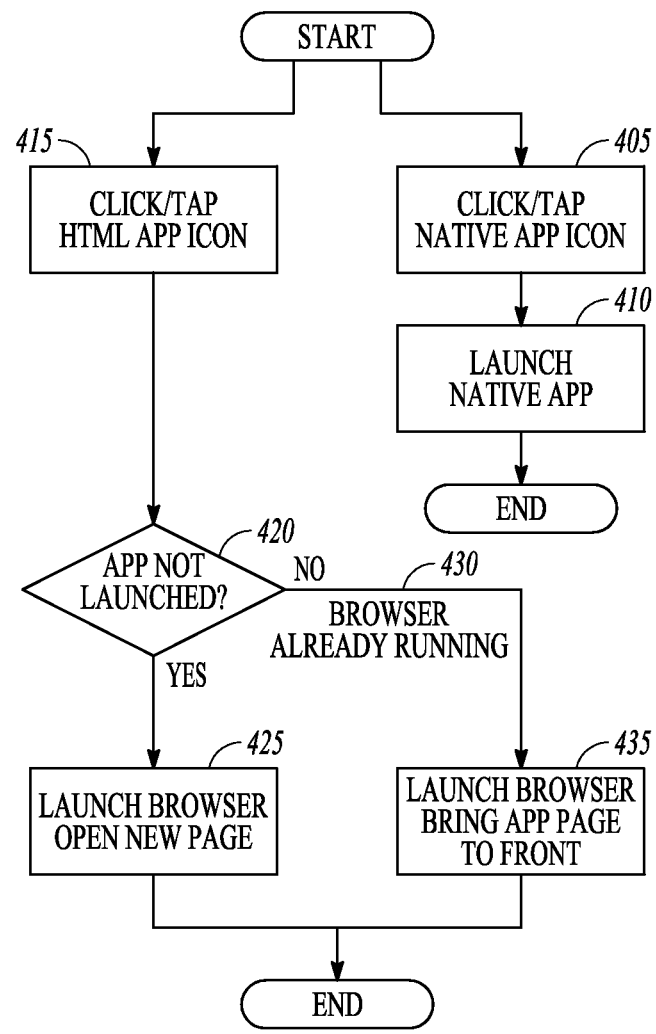
FIG. 4 illustrates a method for launching a native app or an HTML5 app on a mobile device according to an example embodiment.

As illustrated in FIG. 4, when a user selects (405) (e.g., clicks or taps) a native app icon 330a, the interactions are the same as described with respect to typical operation of a native app as described in reference to FIGS. 1A and 1B, in the sense that the corresponding native app 350a launches (410) and occupies the entire display. However, when a user selects (415) an HTML5 app icon 330b, one of two things may occur:

1. If the corresponding app 350b is determined (420) as not being launched (e.g., is not presently in memory 360), the browser 385 is launched and a new page is opened (425). For example, the app URL is launched in the new page, whether the URL is pointing to a location on the local device or over the network; or 2. If the app 350b is already running (430) in the browser 385, the browser is launched (435) and the page where the app is running is brought to the front. According to one example embodiment, it is possible for the app developer to override this behavior by including parameters such as "<on exit=kill app>" or "<on launch=reload app>" which will remove any previous instances from memory and restart the app.

Figure 5:
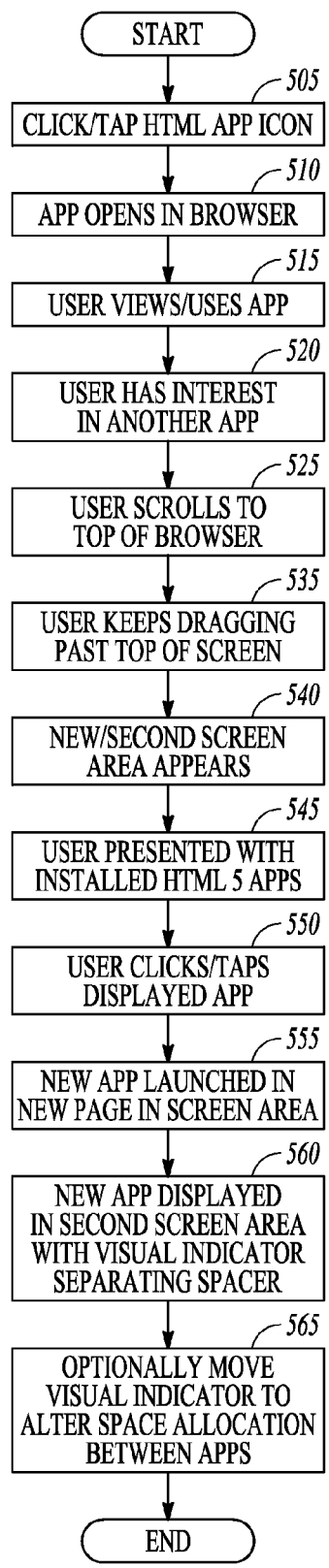
FIG. 5 illustrates a method for launching two or more HTML5 apps in a multi-tasking mode of operation according to an example embodiment.

As indicated above, with HTML5, an HTML5 app 350b that runs inside a browser environment such as the browser 385 provides an opportunity to support multitasking. According to another example embodiment, including a method illustrated in FIG. 5, and user interface layouts illustrated FIGS. 6A, 6B and 6C, interactions with the user may be performed in the following manner:

1. A user selects (505) an HTML5 app icon 330b (for example, to launch an online shopping web app).

2. The HTML5 app 350b opens (510) in the browser 385.

Figure 6A:
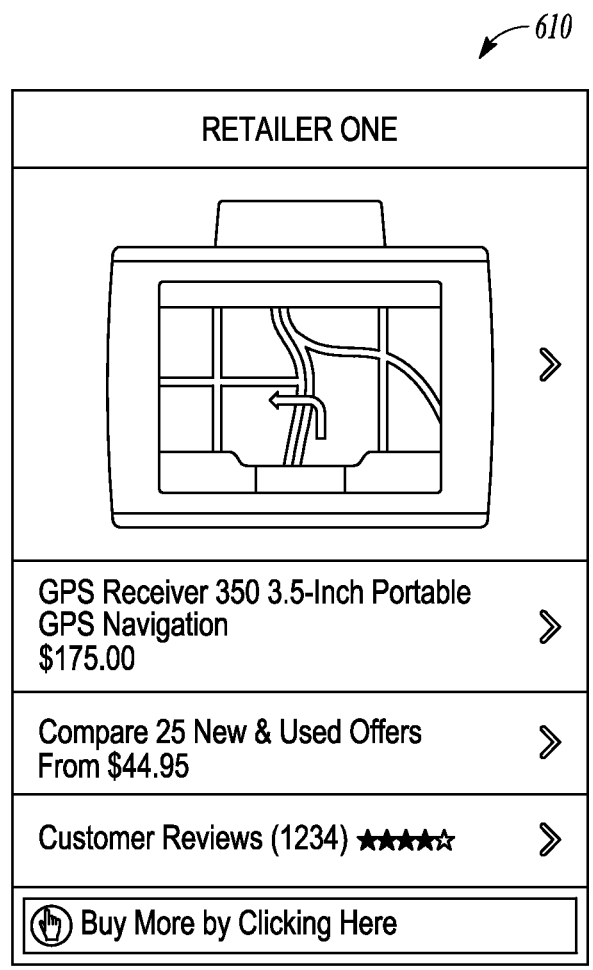
FIGS. 6A, 6B, and 6C illustrate a user interface enabled to launch two or more HTML5 apps in a multi-tasking mode of operation according to an example embodiment.

3. The user then proceeds to view, use, and otherwise interact with the app (515). For example, in an online shopping web app, this may include performing interaction with a product listing, such as a GPS device in an online shopping interface 610 as shown in FIG. 6A.

4. The user is then interested (520) in viewing another app on the mobile device screen, such as to cross reference information or perform a comparison between information displays in two apps. In the online shopping web app example, the user may want to compare prices of the product using another retailer's app or website.

Figure 6B:
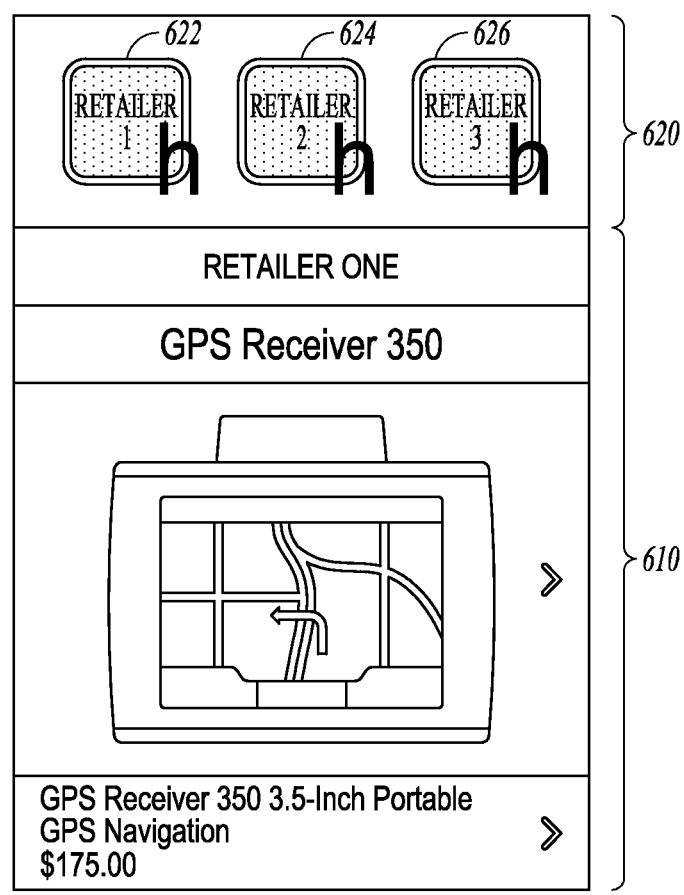

5. The user scrolls (525) to the edge (e.g., the top) of the browser 385 displaying HTML5 app 350b. In a typical browser interaction, if the user drags the screen to the top of the browser 385 (with a dragging hand gesture or similar user interaction), the top of the browser such as the URL address bar may be shown, but nothing else is shown above the browser. In this embodiment, however, if the user keeps dragging past the top of the screen (535), for example attempting to navigate past the URL address bar, a new second, screen area appears (540), as shown in FIG. 6B. On the bottom of the interface shown in FIG. 6B is the "current" browser screen, the Retailer One web app 610; however on the top of the interface, the user is presented (545) with a listing 620 of available HTML5 apps on the device, including icons 622, 624, 626. In one example embodiment, the icon of the currently displayed HTML5 app (the icon 622 corresponding to the displayed Retailer One web app 610) could have an indication that it already is open or being displayed (for example, by shading the icon 622 grey).

Figure 6C:
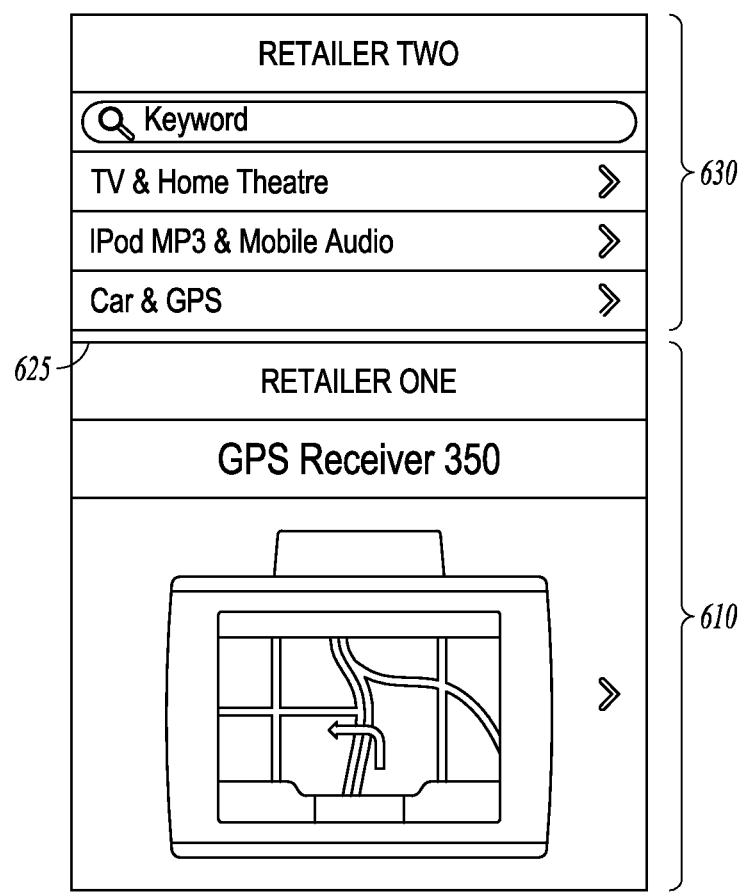

6. The user may then select (550) one of the displayed app icons 622, 624, 626. This will launch (555) that HTML5 app into a new page, or an existing page if the app is already running. In one configuration, the new app will not occupy the entire screen, rather, the screen will be split (560) and the two apps will share the space with a visual indicator 625 separating them. This is illustrated in FIG. 6C, with selected HTML5 app for Retailer Two 630 being displayed on the top portion of the screen; and the HTML5 app for Retailer One 610 being displayed on the bottom portion of the screen. The visual indicator 625 may be moved (565), for example with a touch and drag motion, to allow more, or less, space for a particular application.

According to another embodiment, the system and method supports multiple splitting of the screen. In the case of mobile phones, the interface may not be usable due to screen size or screen resolution, so the browser may limit the number of screen splits. However, in cases where bigger screens and surfaces are available, such as a tablet, or if the smaller screen may be extended or projected into a bigger screen, the browser will support many of those presented in the active space. While the screen splits shown in FIGS. 6B and 6C split the screen into two or more vertical sections, the screen may also be split horizontally. In some examples, the orientation of the split (e.g., vertical or horizontal) may depend on the device's orientation as determined by a position sensor in the device and may even change from vertical to horizontal (or vice versa) based on a change in device orientation.

In yet another example embodiment, one app contains the sub-screens. For example, this functionality may be used in shopping apps where the app can open many sites as child sub-apps inside the parent app and allow the user to browse the individual pages and information tabs from various retailers to compare delivery, shipping, reviews, and such. Thus, a single browser instance may be used to launch multiple windows of web apps. In an alternative embodiment, a first browser may provide one of the subdivided areas on the screen display to display a first web app, and a second browser may provide a different one of the subdivided areas on the screen display to display a second web app. Other combinations of multiple browser instances and browser windows may also be provided.

In yet another example embodiment, the HTML5 apps are enabled to interact with each other and exchange information, for example, copy and paste or even competitive comparison. In one example embodiment, this is supported by a user-controlled copy and paste or a drag and drop feature to provide the interaction between the split screens. For example, performing a drag and drop of text from one web app to another, may automatically activate a text search into the web app having the screen section receiving the drop or paste.

Accordingly, as described above, one browser configuration supports multiple pages running at the same time inside a single browser, while users may view the corresponding pages and web apps of the respective browser windows s concurrently. In other browser configurations, multiple browser instances may provide concurrent display of the corresponding pages and web apps of the respective browser instances concurrently. The corresponding pages and web apps also may be executed in the browser environment by concurrent execution within the browser or browsers.

Although several of the described embodiments were included with reference to the use of HTML5-based markup language standards, it will be understood that the present techniques may be implemented in connection with a variety of dynamic web app platforms and markup language standards. Therefore, the usage of the term "HTML5 app" is not necessarily intended to be limiting to the use of a published draft or standard labeled as "HTML5" by the World Wide Web Consortium (W3C).

As described herein, various methods or techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 7:
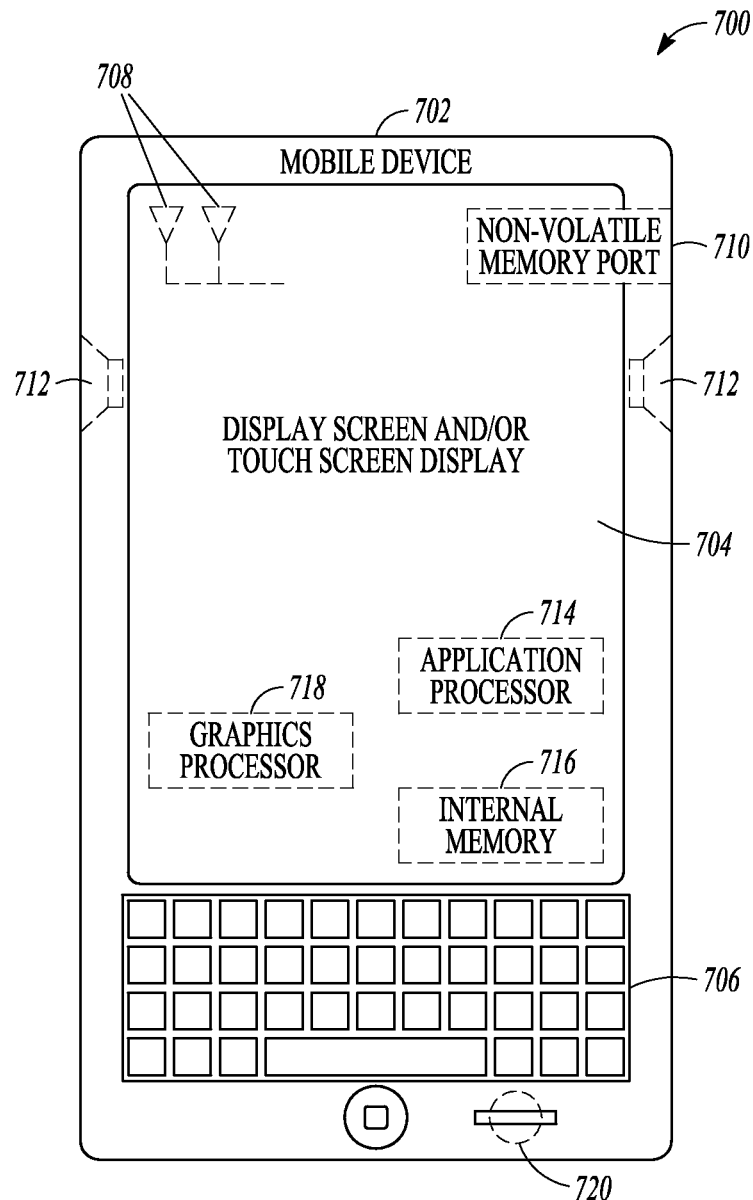
FIG. 7 illustrates an example mobile device on which the systems described herein may be deployed.

FIG. 7 provides an example illustration of a mobile device 700, such as a user equipment (UE), a mobile station (MS), a mobile wireless device, a mobile communication device, a tablet, a handset, or other type of mobile wireless device. The mobile device may include one or more antennas 708 configured to communicate with a base station (BS), an evolved Node B (eNB), or other type of wireless wide area network (WWAN) access point. The mobile device may be configured to communicate using at least one wireless communication standard including 3GPP LTE, WiMAX, High Speed Packet Access (HSPA), Bluetooth, and WiFi. The mobile device 700 may communicate using separate antennas for each wireless communication standard or shared antennas for multiple wireless communication standards. The mobile device may communicate in a wireless local area network (WLAN), a wireless personal area network (WPAN), and/or a wireless wide area network (WWAN).

FIG. 7 also provides an illustration of a microphone 720 and one or more speakers 712 that may be used for audio input and output from the mobile device 700. The display screen 704 may be a liquid crystal display (LCD) screen, or other type of display screen such as an organic light emitting diode (OLED) display. The display screen 704 may be configured as a touch screen. The touch screen may use capacitive, resistive, or another type of touch screen technology. An application processor 714 and a graphics processor 718 may be coupled to internal memory 716 to provide processing and display capabilities. A non-volatile memory port 710 may also be used to provide data input/output options to a user. The non-volatile memory port 710 may also be used to expand the memory capabilities of the mobile device 700. A keyboard 706 may be integrated with the mobile device 700 or wirelessly connected to the mobile device 700 to provide additional user input. A virtual keyboard may also be provided using the touch screen.

Figure 8:
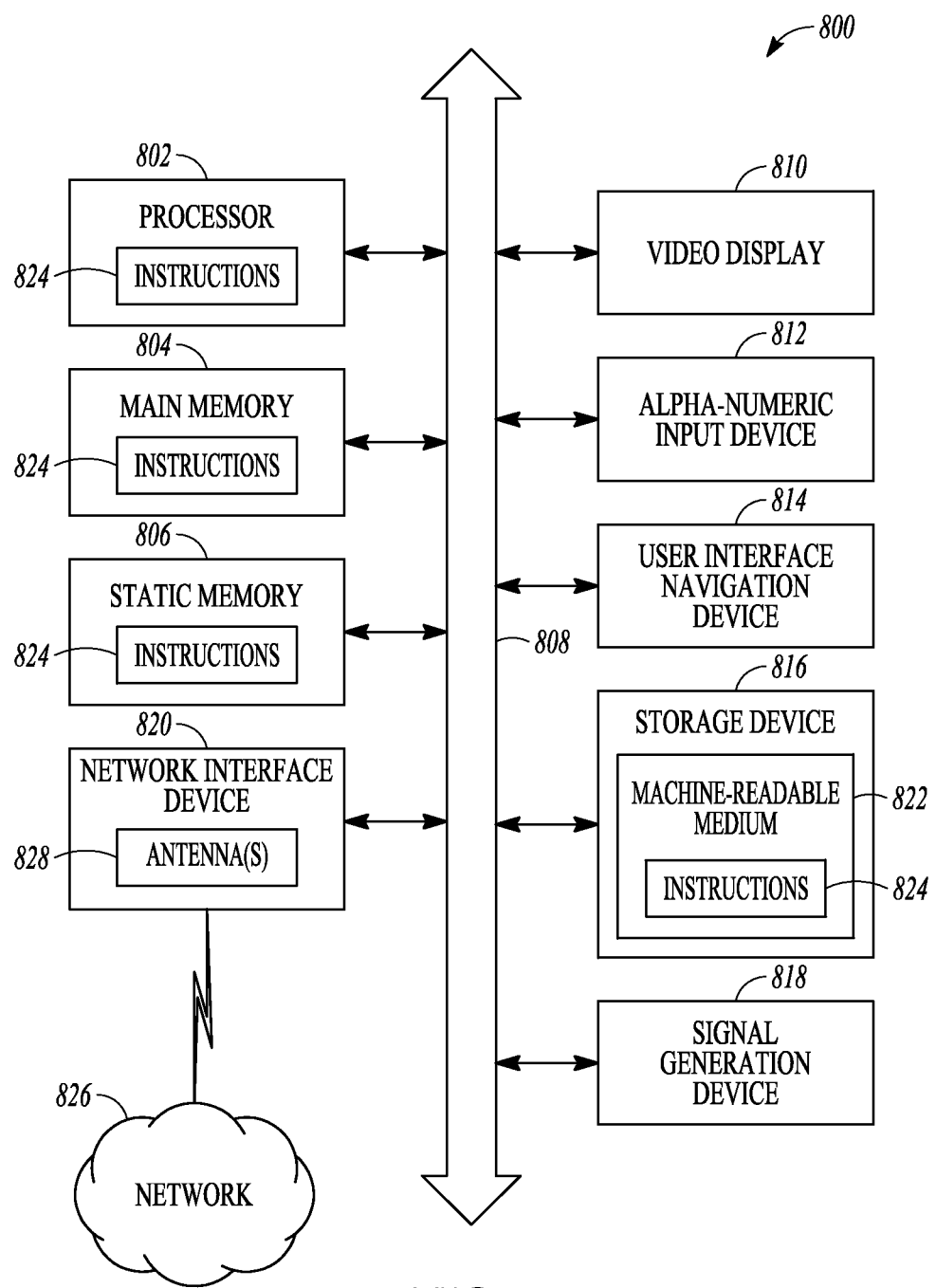
FIG. 8 illustrates an example computer system that may be used as a computing platform for the computing devices described herein.

FIG. 8 is a block diagram illustrating an example computer system machine upon which any one or more of the methodologies herein discussed may be run. Computer system 800 may be used as the processing system 380, or for any other computing platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 802 (e.g., a central processing unit (CPU), a graphics processing unit (GPU) or both), a main memory 804 and a static memory 806, which communicate with each other via an interconnect 808 (e.g., a bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system 800 may additionally include a storage device 816 (e.g., a drive unit), a signal generation device 818 (e.g., a speaker), a network interface device 820 (which may include or operably communicate with one or more antennas 828, transceivers, or other wireless communications hardware), and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network(LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area internet network connection, it will be understood that communications may also be facilitated using any number of personal area networks, LANs, and WANs, using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. For example, a component or module may be implemented as a hardware circuit comprising custom VLSI circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module. For example, in the context of the present disclosure, a component or module configured to respond to user commands to subdivide a screen display may be either included within, or separate from, the computing system, operating system, browser, or web application implementing such functionality.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes a computing device, comprising: a touch screen configured to provide a screen display and receive input from hand gestures; a computer system operative to control the screen display, the computer system including an operating system and one or more browsers configured for execution with the operating system, wherein the one or more browsers are configured to execute one or more web apps; and one or more software modules configured for execution with the operating system, the software modules configured to respond to a dragging hand gesture applied to a web app being displayed in a full screen mode within the one or more browsers, by: subdividing the screen display of the one or more browsers into multiple subdivided areas, and displaying the web app within one of the subdivided areas; launching a second web app and displaying the second web app within a different one of the subdivided areas; and providing concurrent display of the web app and the second web app in a split-screen mode to facilitate user multitasking.

In Example 2, the subject matter of Example 1 may optionally include the software modules being further configured to respond to the dragging hand gesture by: displaying one or more icons used to accept user input to select and launch the second web app, the icons displayed within the different one of the subdivided areas.

In Example 3, the subject matter of one or any combination of Examples 1-2 may optionally include each of the web app and the second web app being coded in a browser-renderable markup language compliant with an HTML5 markup language standard, and wherein the one or more browsers are further configured to render web apps coded in a markup language compliant with the HTML5 markup language standard.

In Example 4, the subject matter of one or any combination of Examples 1-3 may optionally include the software modules being further configured to respond to a second hand gesture applied to the concurrent display of the web app and the second web app by: resizing display proportions between the web app and the second web app in the split-screen mode.

In Example 5, the subject matter of one or any combination of Examples 1-4 may optionally include the software modules being further configured to respond to one or more user commands during the concurrent display of the web app and the second web app by: communicating information between the web app and the second web app.

In Example 6, the subject matter of one or any combination of Examples 1-5 may optionally include the software modules being further configured to provide concurrent display of the web app, the second web app, and one or more additional web apps in the split-screen mode.

In Example 7, the subject matter of one or any combination of Examples 1-6 may optionally include the software modules being further configured to provide concurrent execution and concurrent display for the web app and the second web app.

In Example 8, the subject matter of one or any combination of Examples 1-7 may optionally include the one or more software modules being provided by the one or more browsers.

In Example 9, the subject matter of one or any combination of Examples 1-8 may optionally include the one or more browsers including a first browser providing the one of the subdivided areas, and a second browser providing the different one of the subdivided areas.

Example 10 may include, or may optionally be combined with the subject matter of one or any combination of Examples 1-9 to include a method, comprising: displaying, in a full screen mode of a screen display, a web app within a browser user interface; detecting one or more user commands applied within the browser user interface during the full screen mode to subdivide the screen display and launch a second app; and partitioning the screen display into multiple subdivided areas responsive to detecting the user commands, including:

resizing a display of the web app to one of the subdivided areas; and allocating the second app to display in a different one of the subdivided areas; wherein the second app is concurrently executed and presented with the web app.

In Example 11, the subject matter of Example 10 may optionally include user commands that include one or more hand gestures applied to a touch screen, the touch screen configured to provide the screen display.

In Example 12, the subject matter of one or any combination of Examples 10-11 may optionally include hand gestures that include a dragging motion applied to an edge of the browser user interface.

In Example 13, the subject matter of one or any combination of
Examples 10-12 may optionally include displaying one or more icons used to select and launch the second app, the icons displayed within the different one of the subdivided areas.

In Example 14, the subject matter of one or any combination of Examples 10-13 may optionally include the web app being provided according to a browser-renderable markup language compliant with an HTML5 markup language standard.

In Example 15, the subject matter of one or any combination of
Examples 10-14 may optionally include changing an allocation of the plurality of subdivided areas in the screen display responsive to detecting one or more additional user commands.

In Example 16, the subject matter of one or any combination of Examples 10-15 may optionally include communicating information between the first web app and the second app.

In Example 17, the subject matter of one or any combination of Examples 10-16 may optionally include the second app being a web app executing in the browser user interface.

In Example 18, the subject matter of one or any combination of
Examples 10-17 may optionally include the second app being a native app not executing in the browser user interface.

Example 19 may include, or may optionally be combined with the subject matter of one or any combination of Examples 1-18 to include at least one machine readable storage medium comprising a plurality of instructions that, in response to being executed on a computing device, cause the computing device to provide a browser graphical user interface configured to: display a first web app in a full-screen mode of a screen display; provide a selectable listing of one or more additional web apps for display, the one or more additional web apps including a second web app; receive one or more user commands to display the second web app concurrently with the first web app; and display the second web app and the first web app in a split-screen mode of the screen display.

In Example 20, the subject matter of Example 19 may optionally include user commands that include one or more hand gestures applied to a touch screen, the touch screen configured to provide the screen display.

In Example 21, the subject matter of one or any combination of Examples 19-20 may optionally include hand gestures that include a dragging motion applied to an edge of the browser graphical user interface.

In Example 22, the subject matter of one or any combination of Examples 19-21 may optionally include providing the listing of the one or more additional web apps including displaying a listing of icons representing the one or more additional web apps, wherein receiving the one or more user commands to display the second web app includes detecting a user selection of an icon from the listing of icons representing the second web app.

In Example 23, the subject matter of one or any combination of Examples 19-22 may optionally include each of the first web app and the second web app being coded in a browser-renderable markup language compliant with an HTML5 markup language standard.

In Example 24, the subject matter of one or any combination of Examples 19-23 may optionally include the browser graphical user interface being further configured to: receive one or more user commands to resize display proportions between the first web app and the second web app in the split-screen mode; and responsive to the user commands to resize display proportions, update the screen display of the first web app and the second web app.

In Example 25, the subject matter of one or any combination of Examples 19-24 may optionally include the browser graphical user interface being further configured to: communicate information between the first web app and the second web app.

The Abstract of the Disclosure is intended to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A computing device, comprising:
   processor circuitry;
   a touch screen configured to provide a screen display output and receive input from hand gestures;
   a storage device including instructions, that, when executed with the processor circuitry, performs electronic operations on the computing device including:
   generating an indication of a hand gesture based on a hand gesture input received with the touch screen;
   receiving, by a browser application including instructions that are operable on the processing circuitry, the indication of the hand gesture, wherein in response to the indication of the hand gesture, the browser application is adapted to:
      obtain contextual information displayed in a first web application running in a window of the browser application on the screen display output, wherein the first web application is obtained from a first remote website and is executed locally on the computing device;
      divide the window into a first window and a second window, the first window running the first web application, wherein the first window and the second window are concurrently visible on the screen display output; and
      display, on the screen display output, in the second window, a plurality of icons, wherein the plurality of icons include a plurality of web application icons for respective web applications and a plurality of native application icons for respective native applications, wherein the plurality of web application icons correspond to the respective web applications obtained from respective websites, and wherein the plurality of web application icons includes a selectable icon corresponding to a second web application of the respective web applications;
      wherein a selection and arrangement of the plurality of icons that includes the plurality of web application icons and the plurality of native application icons is determined based on the contextual information displayed in the first web application, wherein the second web application is obtained from a second remote website and is executed locally on the computing device in response to selection of the selectable icon, and wherein the first web application operates in a first browser renderer process of the browser application and the second web application operates in a second browser renderer process of the browser application; and
   displaying, on the screen display output, upon selection of the selectable icon, the second web application in the second window of the browser application, wherein the contextual information displayed in the first web application is used to automatically activate navigation in the second web application to content relating to the first web application, and wherein the first web application is concurrently executed and concurrently displayed with the second web application in response to the automatically activated navigation.

2. The computing device of claim 1, wherein each of the first web application and the second web application are coded in a browser-renderable markup language compliant with an HTML5 markup language standard, and wherein the browser application further includes instructions to render web applications coded in a markup language compliant with the HTML5 markup language standard.

3. The computing device of claim 1, the electronic operations further including:
   responding to an indication of a second hand gesture applied to the concurrent display of the first web application and the second web application by resizing display proportions between the first web application and the second web application in a split-screen mode.

4. The computing device of claim 1, the electronic operations further including:
   communicating, in response to receiving one or more commands during the concurrent display of the first web application and the second web application, information between the first web application and the second web application, wherein the browser application receives the information from the first web application and updates the display, on the screen display output, of the second web application based on comparative data of the first web application and the second web application.

5. The computing device of claim 1, the electronic operations further including providing concurrent display, on the screen display output, of the first web application, the second web application, and one or more additional web applications in a split-screen mode.

6. The computing device of claim 1, wherein the browser application includes a first instance of the browser application providing the first window, and a second instance of the browser application providing the second window.

7. A method, comprising electronic operations implemented with processor circuitry of an electronic device, the electronic operations including:
generating an indication of a hand gesture based on receiving a hand gesture input by a touch screen;
receiving, by a browser application, the indication of the hand gesture;
obtaining, by the browser application, contextual information displayed in a first web application running in a window of the browser application on a screen display of the electronic device, wherein the first web application is obtained from a first remote website and is executed locally on the electronic device;
dividing the window into a first window and a second window, the first window executing the first web application, wherein the first window and the second window are concurrently visible on the screen display;
displaying, on the screen display of the electronic device, in the second window, a plurality of icons, wherein the plurality of icons include a plurality of web application icons for respective web applications and a plurality of native application icons for respective native applications, wherein the plurality of web application icons correspond to the respective web applications obtained from respective websites, and wherein the plurality of web application icons includes a selectable icon corresponding to a second web application of the respective web applications, wherein a selection and arrangement of the plurality of icons that includes the plurality of web application icons and the plurality of native application icons is determined based on the contextual information displayed in the first web application, wherein the first web application is operating in a first browser renderer process of the browser application and the second web application is operating in a second browser renderer process of the browser application; and
displaying, on the screen display of the electronic device, upon selection of the selectable icon, the second web application in the second window of the browser application, wherein the contextual information displayed in the first web application is used to automatically activate navigation in the second web application to content relating to the first web application, and wherein the first web application is concurrently executed and displayed with the second web application in response to the automatically activated navigation.

8. The method of claim 7, the electronic operations further including receiving user commands wherein the user commands include one or more hand gestures applied to the touch screen, wherein the touch screen is configured to provide the screen display.

9. The method of claim 8, wherein the hand gestures include a dragging motion applied to an edge of a browser user interface of the browser application.

10. The method of claim 7, the electronic operations further including displaying one or more icons used to select and launch a native application, the icons displayed within the second window.

11. The method of claim 7, wherein each of the first web application and the second web application is provided according to a browser-renderable markup language compliant with an HTML5 markup language standard.

12. The method of claim 7, the electronic operations further including changing an allocation of the first window and the second window in the screen display responsive to detecting one or more additional user commands.

13. The method of claim 7, the electronic operations further including communicating information between the first web application and the second web application, wherein the browser application receives the information from the first web application and updates the display of the second web application based on comparative data of the first web application and the second web application.

14. The method of claim 7, wherein the first web application is executed and displayed by a first instance of the browser application.

15. The method of claim 7, wherein the second web application is executed and displayed by a second instance of the browser application.

16. At least one non-transitory machine readable storage medium comprising a plurality of instructions that, in response to being executed on a computing device, cause the computing device to provide a browser graphical user interface of a browser application configured to:
generate an indication of a hand gesture based on receiving a hand gesture input by a touch screen;
receive the indication of the hand gesture;
obtain contextual information displayed in a first web application running in a window of the browser application on a screen display of the computing device wherein the first web application is obtained from a first remote website and is executed locally on the computing device;
divide the window into a first window and a second window, the first window executing the first web application, wherein the first window and the second window are concurrently visible on the screen display of the computing device;
display, on the screen display of the computing device, in the second window, a plurality of icons, wherein the plurality of icons include a plurality of web application icons for respective web applications and a plurality of native application icons for respective native applications, wherein the plurality of web application icons correspond to the respective web applications obtained from respective websites, and wherein the plurality of web application icons includes a selectable icon corresponding to a second web application of the respective web applications, wherein a selection and arrangement of the plurality of icons that includes the plurality of web application icons and the plurality of native application icons is determined based on the contextual information displayed in the first web application, wherein the first web application is operating in a first browser renderer process of the browser application and the second web application is operating in a second browser renderer process of the browser application; and
display, on the screen display of the computing device, upon selection of the selectable icon, the second web application in the second window of the browser application, wherein the contextual information displayed in the first web application is used to automatically activate navigation in the second web application to content relating to the first web application, and wherein the first web application is concurrently executed and displayed with the second web application in response to the automatically activated navigation.

17. The machine readable storage medium of claim 16, the plurality of instructions further to cause the browser application to:

receive user commands, wherein the user commands include one or more hand gestures applied to the touch screen, wherein the touch screen is configured to provide the screen display.

18. The machine readable storage medium of claim 17, wherein the hand gestures include a dragging motion applied to an edge of the browser graphical user interface.

19. The machine readable storage medium of claim 16, wherein each of the first web application and the second web application are coded in a browser-renderable markup language compliant with an HTML5 markup language standard.

20. The machine readable storage medium of claim 16, the plurality of instructions further to cause the browser application to:
   receive one or more user commands to resize display proportions between the first window and the second window in a split-screen mode; and
   responsive to the user commands to resize display proportions, update the screen display of the first web application and the second web application.

21. The machine readable storage medium of claim 16, the plurality of instructions further to cause the browser application to:
   communicate information between the first web application and the second web application, wherein the browser application receives the information from the first web application and updates the display of the second web application based on comparative data of the first web application and the second web application.

* * * * *